Patented Nov. 2, 1937

2,097,773

UNITED STATES PATENT OFFICE 2,097,773

STABILIZED COLORED GASOLINE

John Wesley Orelup, East Orange, N. J., assignor, by mesne assignments, to Patent Fuels & Color Corporation, Cincinnati, Ohio, a corporation of Ohio No Drawing. Application May 27, 1929
Serial No. 366,523

6 Claims. (Cl. 44—9)

My present invention relates to improvements in the art of coloring gasoline or other petroleum distillates. It has been found that particularly for some colors only a comparatively few dyestuffs are soluble in gasoline. In many instances, it is found that when the dyestuff is dissolved in benzol, for example, and the mixture poured into gasoline, the dye will at first apparently color the gasoline but after a short time will precipitate in the bottom of the vessel in a flocculent state and leave the gasoline uncolored.

I have now discovered that certain substances of colloidal nature, particularly of the hydrophobe type, when present in the gasoline-dye mixture act as stabilizers therefor preventing the separating out of the dye. I have found that in many instances due to the presence of the stabilizing agent such dyes not normally soluble yield a clearly defined absorption spectrum, indicating a state of division approaching true solution. The action of these substances seems to be either that of a protective colloid preventing the growth of the dye particle or to prevent the formation of nuclei of moisture tending to precipitate the dye.

As examples of stabilizing agents which I have found suitable, I may mention the metal fatty acid compounds and metal resin compounds as aluminum palmitate, aluminum stearate, magnesium oleate, magnesium stearate, magnesium resinate, magnesium palmitate, zinc oleate, zinc stearate, calcium stearate, calcium oleate, etc.

As examples of dyes to which I have found my invention to be applicable, I may mention spirit blue, opal blue, victoria blue base, arylated rosanilines, basic triphenyl methanes, indulines, indazines and nigrosines, rhodamines, acridines, phthaleines. In case the colors are of a strongly basic character they may be mixed with an organic acid such as stearic, oleic, or benzoic to develop the tinctorial power when this is necessary.

As an illustrative example of a stabilized mixture of the dyestuff and gasoline and method of preparing same, I may mention the following: One part stearic acid, one part spirit blue (a phenylated rosaniline) and two parts aluminum stearate, are dissolved in a small amount of benzol and the concentrated benzol solution then added to the gasoline in the proportion of approximately one part dye mixture to one hundred thousand parts gasoline. This gives a clear, bright, stable blue colored gasoline.

While I have set forth several dyestuffs to which my invention is applicable, it will be understood that such list is illustrative only and is not intended to be exhaustive. Furthermore, other stabilizing agents of similar composition to those mentioned may also be found suitable.

One valuable result of my invention is that by its use it is possible to form a stable mixture of gasoline and a dye producing fluorescence, as, for example, acridine yellow or other acridine dye. In other words, I have found that the stabilizing agents proposed by me have the additional property of bringing out the fluorescence inherent in such dyestuffs.

My invention is also particularly applicable to that intermediate class of dyes which while under some conditions are stable, nevertheless precipitate out in the presence of slight amounts of moisture and acid. It will be understood that in order to produce certain desired shades of color it may be of advantage to combine with the stabilized colored gasoline other dyes as, for example, those of the anthraquinone group, which are soluble in gasoline and which, if used alone, would not require the presence of a stabilizing agent.

My invention is likewise applicable to petroleum distillates, as for example lubricating oils.

I claim:

1. A stabilized colored gasoline containing a coloring material having the property normally of separating out from such gasoline in the presence of slight amounts of acid present or developed and moisture and of being capable of exhibiting fluorescence, said mixture being additioned by a dispersing agent of the hydrophobe type imparting stability to such mixture and bringing out the fluorescence of such coloring material.

2. A colored gasoline containing a dye not normally yielding a substantial degree of fluorescence but having latent fluorescent properties, together with a stabilizing agent of the hydrophobe type imparting stability to the mixture of gasoline and dye and developing the fluorescence of said dye.

3. The mixture according to claim 2 in which the dyes are of the acridine class.

4. A mixture of a petroleum distillate and an organic coloring material not normally yielding a substantial degree of fluorescence in admixture with said distillate but having latent fluorescent properties, together with a stabilizing agent of the hydrophobe type imparting stability to the mixture of distillate and dye and developing the fluorescence of said dye.

5. A mixture of a lubricating oil and an organic coloring material not normally yielding a substantial degree of fluorescence in admixture with said oil but having latent fluorescent properties, together with a stabilizing agent of the hydrophobe type imparting stability to the mixture of oil and dye and developing the fluorescence of said dye.

6. A mixture according to claim 5 in which the dyes are of the acridine class.

JOHN WESLEY ORELUP.